(12) United States Patent
Hoeven

(10) Patent No.: US 12,083,924 B2
(45) Date of Patent: Sep. 10, 2024

(54) ENERGY STORAGE SYSTEM AND METHOD

(71) Applicant: Siemens Energy AS, Oslo (NO)

(72) Inventor: Thomas Hoeven, Oslo (NO)

(73) Assignee: Siemens Energy AS, Oslo (NO)

( * ) Notice: Subject to any disclaimer, the term of this patent is extended or adjusted under 35 U.S.C. 154(b) by 435 days.

(21) Appl. No.: 17/426,989

(22) PCT Filed: Jan. 21, 2020

(86) PCT No.: PCT/EP2020/051379
§ 371 (c)(1),
(2) Date: Jul. 29, 2021

(87) PCT Pub. No.: WO2020/160899
PCT Pub. Date: Aug. 13, 2020

(65) Prior Publication Data
US 2022/0111752 A1    Apr. 14, 2022

(30) Foreign Application Priority Data

Feb. 5, 2019 (GB) ..................................... 1901581

(51) Int. Cl.
*H02J 7/00* (2006.01)
*B60L 53/66* (2019.01)
(Continued)

(52) U.S. Cl.
CPC .............. *B60L 53/80* (2019.02); *B60L 53/66* (2019.02); *B63H 21/17* (2013.01); *H02J 7/0013* (2013.01)

(58) Field of Classification Search
USPC .................................................. 320/101, 106
See application file for complete search history.

(56) References Cited

U.S. PATENT DOCUMENTS

| 9,004,961 B1 * | 4/2015 | French ................... | B63H 20/00 320/125 |
| 2009/0082957 A1 * | 3/2009 | Agassi .................... | B60L 53/65 701/532 |

(Continued)

FOREIGN PATENT DOCUMENTS

| CN | 108501896 A | 9/2018 |
| CN | 108639262 A | 10/2018 |

(Continued)

OTHER PUBLICATIONS

International search report and written opinion dated Mar. 24, 2020, for corresponding PCT/EP2020/051379.

*Primary Examiner* — Samuel Berhanu
(74) *Attorney, Agent, or Firm* — Wolter Van Dyke Davis, PLLC

(57) ABSTRACT

A method of providing energy storage units to an energy storage system on a vessel adapted to use stored energy includes receiving notification at a charging station onshore, of a user energy storage requirement; dispatching an autonomous vehicle from the charging station with one or more replacement energy storage units for the system; removing one or more used energy storage units from an operational location of the system; inserting the replacement energy storage unit at the same operational location of the system; and returning the used energy storage unit to the charging station.

18 Claims, 4 Drawing Sheets

(51) Int. Cl.
  *B60L 53/80* (2019.01)
  *B63H 21/17* (2006.01)

(56) References Cited

U.S. PATENT DOCUMENTS

| | | | |
|---|---|---|---|
| 2012/0045303 A1* | 2/2012 | Macdonald | A47F 10/00 |
| | | | 414/373 |
| 2013/0009592 A1* | 1/2013 | Larsen | H02J 7/0045 |
| | | | 320/107 |
| 2016/0321740 A1 | 11/2016 | Hill | |
| 2017/0174092 A1* | 6/2017 | Köhnke | B60L 53/80 |
| 2017/0355354 A1* | 12/2017 | Hassounah | B60L 53/80 |
| 2018/0041053 A1* | 2/2018 | Capizzo | A63H 30/04 |
| 2018/0222338 A1 | 8/2018 | Sponheimer et al. | |

FOREIGN PATENT DOCUMENTS

| | | |
|---|---|---|
| CN | 109703726 A | 5/2019 |
| WO | 2018084716 A1 | 5/2018 |

* cited by examiner

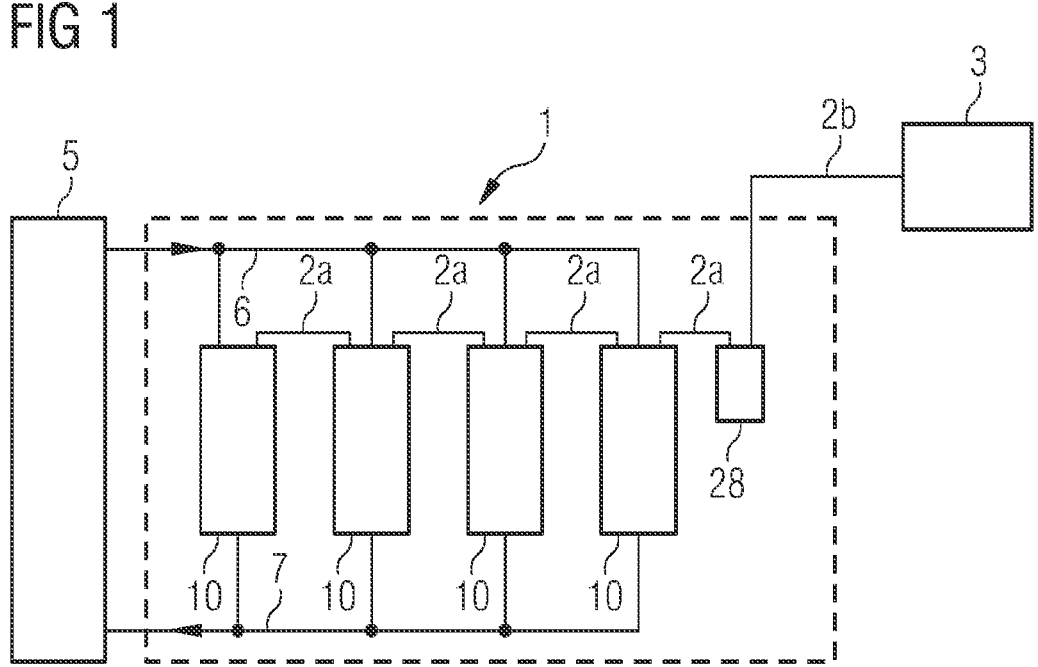
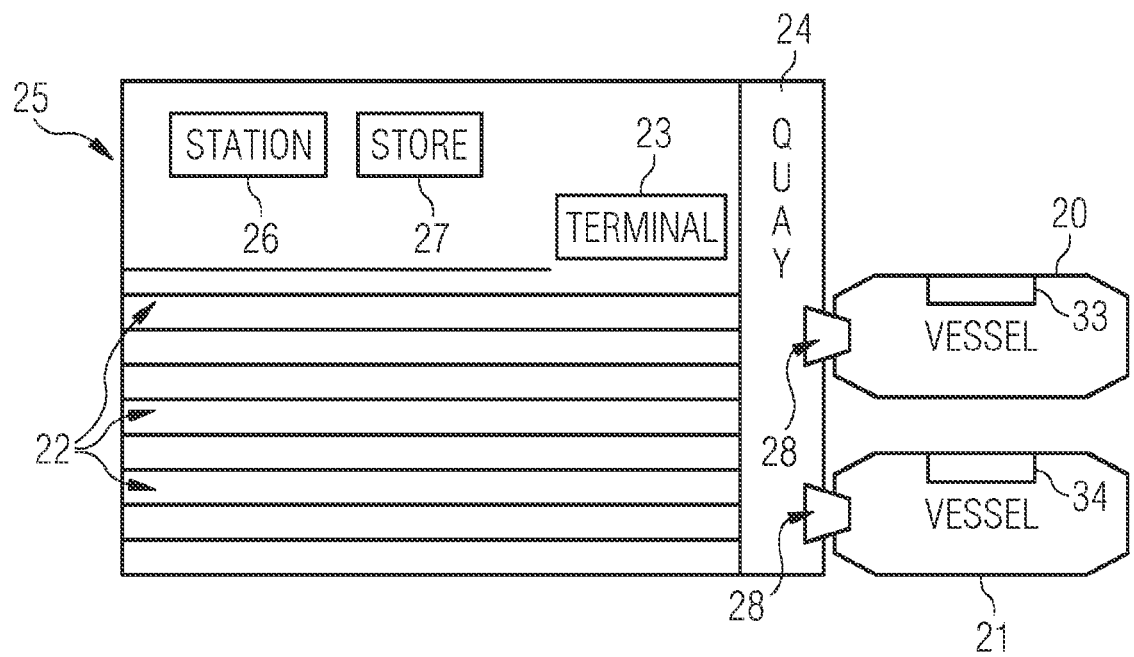

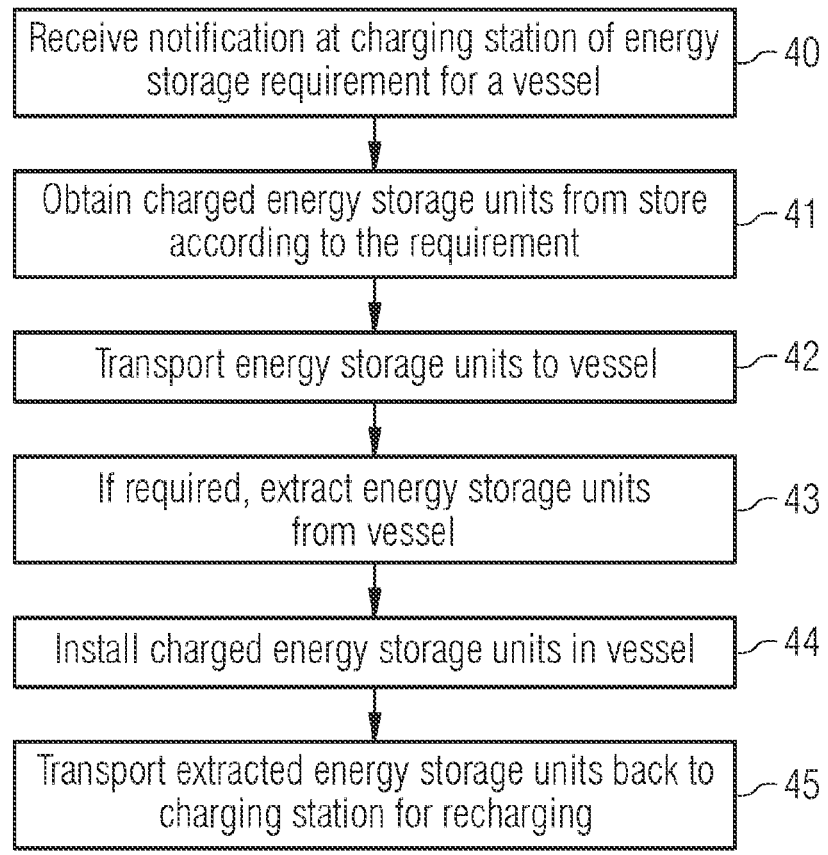

ENERGY STORAGE SYSTEM AND METHOD

CROSS REFERENCE TO RELATED APPLICATIONS

This application is the US National Stage of International Application No. PCT/EP2020/051379 filed 21 Jan. 2020, and claims the benefit thereof. The International Application claims the benefit of United Kingdom Application No. GB 1901581.7 filed 5 Feb. 2019. All of the applications are incorporated by reference herein in their entirety.

FIELD OF INVENTION

This invention relates to energy storage modules for a system that consumes energy and a method of installing the energy storage modules in the system.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In some countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether for a hybrid, or fully electric, system, the stored energy units need to be charged from an electricity supply of some type when they become depleted.

SUMMARY OF INVENTION

In accordance with a first aspect of the present invention, a method of providing energy storage units to an energy storage system on a vessel adapted to use stored energy comprises receiving notification at a charging station onshore, of a user energy storage requirement; dispatching an autonomous vehicle from the charging station with one or more replacement energy storage units for the system: removing one or more used energy storage units from an operational location of the system; inserting the replacement energy storage unit at the same operational location of the system; and returning the used energy storage unit to the charging station.

The method may further comprise connecting the used energy storage units to a charger in the charging station to recharge the energy storage units.

The method may further comprise receiving an indication of a level of energy remaining in the or each energy storage unit in the system when the vessel is still under way; determining the time remaining until the vessel docks and dispatching the autonomous vehicle to meet the vessel when it docks.

The charging station may monitor type and number of stocked charged energy storage units onshore and provides an availability list to the vessel in response to the notification of the user energy storage requirement.

The vessel energy management system may request the type and number of energy storage units closest to its requirement.

In accordance with a second aspect of the present invention, an energy storage supply system adapted for carrying out the method the first aspect comprises one or more energy storage units adapted for use on a vessel; one or more of the energy storage units being stocked by a store associated with an onshore charging station; a communications interface between a vessel and the charging station to enable notification of an energy storage requirement to be received from the vessel; and an autonomous vehicle associated with the charging station to transport the one or more energy storage units between the charging station and the vessel.

The system may use custom-sized containers, built to a size required for the purpose, for the energy storage modules. Alternatively, the system may comprise a plurality of energy storage units containing energy storage devices, mounted within an ISO standard container or custom sized container.

A full or half container may be used according to the amount of energy storage required and the size of the operational location on the vessel.

The energy storage unit may connect to an electrical system of the ship via connectors in the base of the container when installed.

The energy storage unit may make the connection when lowered into place and disconnect when lifted up again, or a subsequent step may be required to cause the electrical connection once the new energy storage unit is in place.

The energy storage unit may connect to an electrical system of the ship via connectors, rails or pantograph on the side of or at the top of the energy storage unit when placed on the vessel or at the charging station onshore.

The autonomous vehicle may comprise an autonomous lorry cab and trailer, or a single autonomous self-driving transport unit, to transport the energy storage units.

The energy storage units may remain on the trailer when installed on the vessel and the lorry cab may be detached from the trailer. Alternatively, the energy storage units may remain on the autonomous self-driving transport unit when installed on the vessel, or may be removed from the trailer or transport unit by lifting equipment associated with the trailer and installed in the energy storage system of the vessel.

BRIEF DESCRIPTION OF THE DRAWINGS

An example of an energy storage system and method according to the present invention will now be described with reference to the accompany drawings in which:

FIG. 1 is a block diagram illustrating an example of a modular stored energy system, which may be used with the method of the present invention;

FIG. 2 illustrates a situation in which the method of the present invention may be applied;

DETAILED DESCRIPTION OF INVENTION

Figure 3:
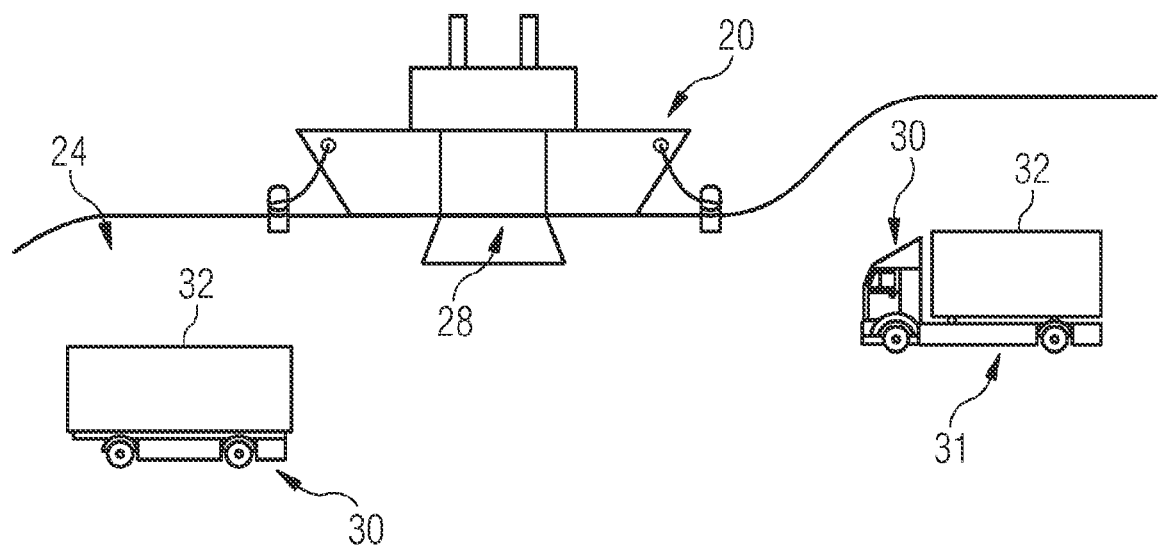
FIG. 3 provides further illustration of an example of the method of the present invention.

Energy storage systems for supplying electrical energy for marine applications, such as systems onboard vessels may need to provide up to 1 MWh energy and in some cases even more, which may be achieved by providing an energy storage unit in which multiple energy storage modules are combined. The electrical energy may be stored in modules, each module using a particular type of energy storage device. Examples include an electrochemical cell, or battery, capacitor banks, high capacity capacitors, such as ultracapacitors or supercapacitors, mechanical energy storage, such as flywheels, thermal or chemical energy storage, any of which are capable of providing electrical energy to an end user, The energy storage modules may be provided with cooling systems which are fluidly connected in parallel, or in series and the energy storage modules may be electrically connected together in series. Each module may comprise a plurality of energy storage devices, such as battery cells, connected together in series, or comprising groups of parallel connected devices, each connected to the next group, or individual cell, in series, to provide the required total module voltage, power handling and energy storage capability required. For example, each battery cell may only have a voltage of the order of 3V to 4.2V, but in a module having multiple cells, electrically connected together in series and/or parallel, this results in higher voltages, power handling and energy storage capabilities.

Different types of electric powered vessels may have different requirements. Vessels which travel mainly offshore and only occasionally come into harbour may only use their electric power when in port. For certain applications, such as ferries carrying out regular short crossings in harbours, or for vessels using inland waterways with regular stops to pick up or set down passengers, electric power may be the only type of power used, both for propulsion and for auxiliaries. The short turn-around times of such vessels generally mean that the time available for charging is not sufficient. In some cases, the electric powered vessel may dock, or stop at an embarkation point, for only a few minutes, which would be insufficient to properly charge the batteries. Even if fast charging points were provided, not all the locations have a shore supply that can support this type of fast charging. As fast charging requires a very high rated power supply from the electric utility supply, costly upgrades to the utility electrical power grid are likely to be needed and in remote, or rural locations, these are unlikely to be viable.

In larger ports, where the electricity supply is more reliable, shore power connection systems tend to have fixed locations, taking up precious space on the quayside adjacent to the ferry when it docks and limiting the precise part of the quayside at which the vessel can tie up, causing more complication for the port authorities at busy times, trying to coordinate all arriving and departing vessels. For example, EP3342626 describes a charging connection device with a pivoting arm that can be mounted to a ramp on shore via which a ferry passengers and vehicles embark and disembark. The arm has a camera to enable the arm to be moved to line up with a corresponding connector on the bow of the ferry, so that the electric vessel is charged whilst the vessel is docked. However, this requires the electric vessel to have a corresponding connector in the correct location and to use only slipways with that type of ramp and power connection.

The present invention addresses these problems by providing a modular energy storage system comprising energy storage modules which may be charged at a charging station away from where the vessel docks. The modules, which are interchangeable with the energy storage module on the vessel, may be brought to the vessel on demand by an autonomous vehicle. Used energy storage modules are moved from the vessel by the autonomous vehicle and returned to the charging station. When they have been recharged, they are available for other vessels, passing the same stop, or arriving in port, at a later time. The energy storage modules are transported to and from the vessel using an unmanned autonomous vehicle, i.e. one capable of operating without direct human control. The autonomous vehicle has its own motive power, so that it is independent of any physical power infrastructure, such as cable connections, or rails. This allows the port to offer a service to any vessel that provides suitable access to let the autonomous vehicle onboard, at any time of day or night, without needing to employ additional workers to drive the vehicles, or to operate equipment to make electrical connections to the vessel.

An example of an energy storage system in which the present invention may be applied, for example as described in our patent application no. WO2019141510, is illustrated in FIG. 1 in which electrochemical cells are described, although other types of energy storage systems that are suitable for the method described above, may equally well be used and the method is not limited to the energy storage system described hereinafter. The system of the example of FIG. 1 comprises a cabinet, or cubicle 1, in which a plurality of energy storage modules 10 are electrically connected together in series by buses 2a to a cubicle controller 28 and by bus 2b to a central controller 3. Each of the energy storage modules is cooled by cooling fluid, circulating from cooling system 5 through inlet pipes 6 and outlet pipes 7. The energy storage modules 10 may comprise a plurality of energy storage devices, for example battery cells, electrically connected together in series, or in parallel. Multiple groups of parallel devices may be connected together in series. In the example described in WO2019141510, Li ion cells are used, each operating at voltages of between 3V DC and 4.2V DC and able to be connected together to produce up to 150V DC per module and by connecting multiple modules together, each unit may operate at around 1 kV.

Non-limiting examples of energy storage devices include electrochemical cells, such as batteries, for example Li-ion, alkaline, or NiMh batteries, or others, non-cylindrical, or cylindrical, capacitors, ultracapacitors, or supercapacitors, fuel cells, flywheels, thermal or chemical energy storage. Energy storage systems relevant for many vessels typically operate on voltages below 1000V as this allows the use of low voltage converters which are a suitable choice for many of the intended applications. Larger systems may need to operate at above 1000V and the combination and type of energy storage is chosen according to the intended application. For example, flywheel energy storage may be used on a vessel to provide a store of electrical energy for port manoeuvres, where reducing emissions is critical, whilst using fossil fuel, such as diesel, or fuel oil, offshore. Whilst the vessel is in transit, the flywheel may be charged in periods where there is excess power being generated on the vessel offshore and store that for use when the main engines are shut down to avoid emissions when coming into port. However, once in port, the vessel cannot use this method to recharge the flywheel to leave again, so the method of the present invention allows a replacement, pre-charged, flywheel to be supplied.

FIG. 2 illustrates an example of a typical port layout for a ferry service where the method and system of the present invention may be applied. One or more vessels 20, 21 may dock, typically end on to the quayside 24. On each vessel 20, 21, an operational location 33, 34 for the energy storage units is defined. A ramp 28 from the quay and/or ramp from the vessel enable passengers, vehicles and cargo to go on and off the ferry. For a vehicle ferry, vehicles typically queue in loading lanes 22, waiting for their ferry and are then directed on board by loading control staff from the port. Foot passengers may wait at a terminal 23 until invited to board. An energy storage unit charging station 26 may be provided within the dock area, but away from the quayside, although for rivers and canals, most jetties are in public areas, without large amounts of private land adjacent to them, so the charging station is more likely to be provided at another location, set back from the river or canal. The advantage of using the method of the present invention in a port area is that all vehicle movements within the port area can be coordinated. Thus, autonomous vehicles can operate more safely by communicating with each other and with the port vehicle controllers to ensure that they do not try to board the vessel in conflict with human operated vehicles. As shown in FIG. 3, the autonomous vehicle may be entirely self-contained, with both motive power and the energy storage module or modules in a single entity 30 or may comprise a traction unit 30, or cab, and a separate trailer 31 to carry the energy storage unit. Once the vessel 20 has docked, the autonomous vehicle 30, (and optionally a trailer 31) may be dispatched with charged energy storage modules, or units, 10 to replace those on board. The vehicle 30, 31 negotiates its way on and off the vessel, entering and leaving via the vehicle ramp 28 and coordinating its movements with the traffic controller.

By combining an autonomous vehicle 30, 31 with an energy storage unit in modular form, such as a containerized battery, or other type of energy storage 32, such as a flywheel, as described above, that can be charged onshore away from the dockside, the energy storage unit 32 can take itself onto the vessel 20, 21 when the vessel is alongside and the vessel is restored to a fully charged state in a very short time. Conveniently, the energy storage may comprise an ISO standard container 32, for example 20 ft or 40 ft containers if suitable for the storage capacity needed, into which a suitable number of energy storage units 10 have been installed and connected together to provide an energy source for a vessel which uses electric power for both propulsion and ancillaries, even if not exclusively. Alternatively, a custom sized container may be used. The vehicle 31 may respond to a request from an energy management system on the vessel for a change of energy storage unit 32, so that the vessel can depart again with a full charge, without having taken up any valuable quayside space 24 during the charging process, or restricting which area of the docks any particular vessel can use, or requiring the vessel to stay connected to a charger for a particular length of time.

Figure 4:
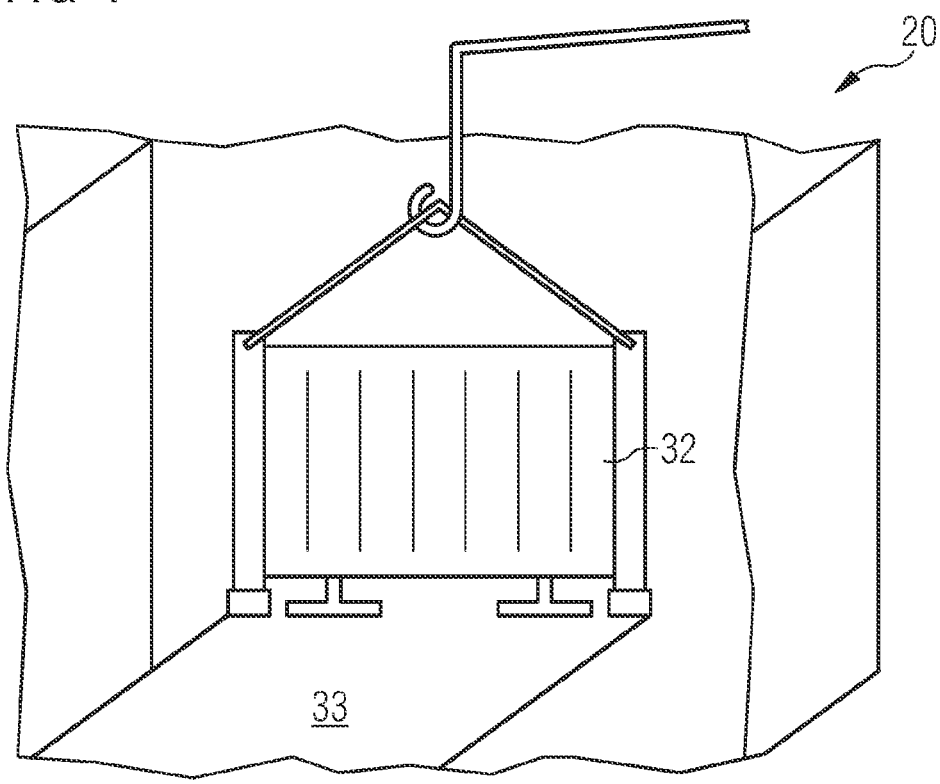
FIG. 4 illustrates detail of a system which may be used in the method of the present invention.

FIG. 4 illustrates one possible way of installing the energy storage unit container 32 in the vessel. The autonomous vehicle drives the container on board the vessel, either within the self-contained entity 30, or on a trailer 31, then lifts the container, for example using a crane carried on the entity or trailer. The container 32 is lowered into place onto connectors in the vessel which come together with connectors in the base of the container, so that electrical power for the vessel propulsion and ancillaries is available. Another option, not shown, is to leave the trailer on the vessel, with the energy storage unit container 32 in place on the trailer and provide suitable anchors to ensure that the container does not move in transit. Connections to the vessel power distribution system may be made, for example, by a robot arm moving into contact with a suitable connector in the side of the container. If the trailer itself is autonomous, then it may carry the energy storage units onboard and connect to the vessel power distribution system, then be entirely replaced by another similar autonomous trailer and energy storage unit combination at the next stop for replenishment.

The vessel may have more than one energy storage module 10, so that during exchange of the main energy storage, the vessel 20, 21 can continue to operate the electrical systems that it requires when docked, such as lighting, heating and for powering operation of doors and ramps to facilitate loading and unloading. Alternatively, an additional, self-contained, energy storage system may be installed on board the vessel and charged from the primary energy storage system to cover such short term in-port use for powering vessel systems while the discharged battery and charged battery swap places on the vessel, or to give additional range to the vessel in exceptional cases.

Figure 5A:
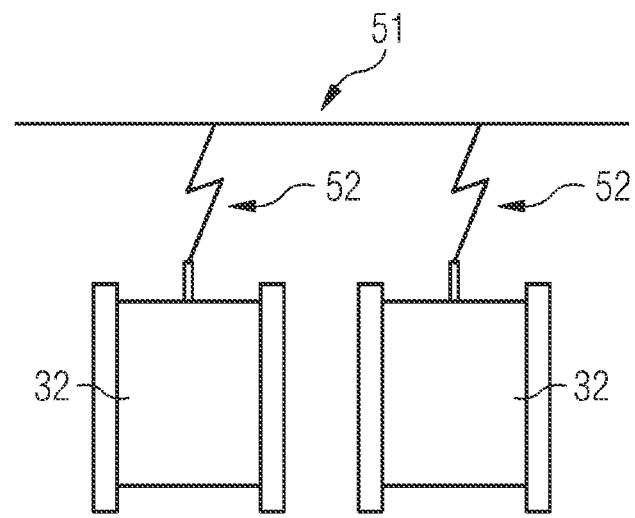
FIGS. 5a and 5b show alternative embodiments for charging energy storage units in the method of the present invention; and, FIG. 6 is a flow diagram illustrating installation according to the method of the present invention, of energy storage units.
Figure 5B:
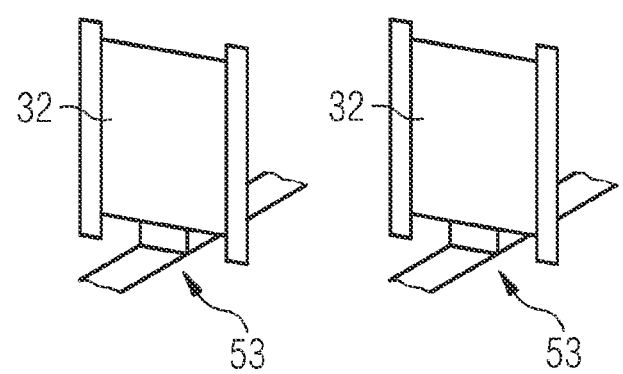

The system may use any suitable type of connection between the energy storage unit and the vessel and between the energy storage unit and the charging station. For example, the energy storage unit may connect to the charging station by means of a plug system, a bus-bar rail connection, or a pantograph arrangement. Similarly, any of these types of connection may be used to connect the energy storage unit to the electrical system on board the vessel, for example connecting to the top of, or to one side of the energy storage unit container 32. Examples of these are illustrated in FIGS. 5a and 5b. FIG. 5a illustrates an overhead supply 51 to which the energy storage units 10 in their container 32 can be electrically connected via a pantograph 52. On returning from the vessel, the containers are placed in the charging station and connect to the electricity supply. An alternative is to make use of bus bar rails 53, or plugs beneath the container, so the container is lowered into position in the same way as for the example of FIG. 4 on the ferry. This is particularly convenient, as the same connections may be used both to charge the energy storage units and to provide power to the vessel, in conjunction with suitable connections on the ferry or in the charging station.

Any of these types of connection may be used to charge the energy storage unit over a relatively long period of time, so that peak loads on the local electrical power grid where the charging station is located, can be reduced, or avoided. The location of the charging station is preferably away from the quayside, but typically still within the port area, so that the autonomous vehicle does not need to go onto the public highway. This type of charging system has the advantage that any infrastructure is away from the quayside, so no modifications of the existing quayside area are required.

Part of the charging station 26 may include storage 27 for different energy storage modules 10, for example, modules using flywheels, or batteries, or modules using different battery types, or with different ratings, to meet the requirements of the types of vessel typically expected to use the port. If a new service is to use a port, then the ship operator may send suitable spare energy storage units in advance of the first arrival of the vessel, so that ready charged units are available when the vessel docks. Energy storage units held in the store 27 may be replaced with different types as the vessels are adapted and upgraded. The port authority may operate the service themselves or may use a third-party company to operate the onshore charging station 26 and delivery and retrieval of the energy storage units on autonomous vehicles 30, 31. In some cases, the storage 27 and charging station 26 are integrated and within the charging station each stored energy storage unit is monitored and provides an indication, as soon as it is fully charged, that it is now available to be deployed to a vessel. In other cases, the energy storage units 32 are moved to the storage area 27 once fully charged, freeing up the charging station connections for other energy storage units. In this case, the energy storage units may connect to trickle charging facilities if they are expected to be stored for any length of time.

FIG. 6 shows a method according to the present invention which may be applied in an energy storage system comprising one or more energy storage units 10 in a container 32 adapted for use on a vessel 20, 21. An operational location 33, 34 for the energy storage units 10 is defined on the vessel, at which the necessary connections are present The energy storage units 10, in their containers 32, may be stocked by a store 27 associated with an onshore charging station 26, as described above either integrated with the charging station, or at a separate location. The system requires a communications interface, for example radio, or wireless communication, between the vessel 20, 21 and the charging station 26 to enable notification of an energy storage requirement to be received from the vessel. When the charging station 26 receives 40 notification from the vessel of its charging requirement, such as amount of charge, type of unit, number of units, then the charging station sends an instruction to an associated autonomous vehicle to extract 41 one or more suitable charged units 32 from the store 37, or from a charging point in the charging station and to transport 42 the units 32 on the autonomous vehicle 30, 31 to the vessel 20, 21.

The autonomous vehicle may access stored data related to the berth number to find the correct vessel and operational location 33, 34 on that vessel to deliver the energy storage units to, or may use GPS data provided in the request to locate the specific vessel and operational location. For a cab and trailer combination, if the autonomous vehicle is replacing a container, either by lifting the container off the trailer, or by leaving the trailer and container in place, then the energy storage units 10 in their container 32 being replaced may need to be removed first. This can be done by detaching temporarily to extract 43 the container 32, or trailer 31, already in place. Alternatively, a separate cab 30 is sent ahead to extract the used energy storage first. For a self-contained autonomous vehicle 30, or self-driving trailer 31, which is not going to remain on the vessel, the used energy storage unit 10 may need to be moved out of the way first, if the vessel does not have redundant connections in the operational location to allow the new unit to be put into position before the old unit is extracted.

The autonomous vehicle then installs the energy storage units in the vessel 20, 21, in their containers 32 by whichever method is applicable for that vessel and container combination. If the same cab 30, or self-driving unit, is taking the extracted container back 45 to the charging station, then the autonomous vehicle 30 returns. If not, then the cab, or self-contained autonomous vehicle, may return to a waiting area to collect a new trailer, or another used energy storage unit, off another vessel. If the trailer 31 itself is autonomous, then it may remain on the vessel until it needs to take that container off for recharging after the energy has been used up.

As described above, the benefits of the present invention include less costly infrastructure upgrades on the shore-side and avoiding the need to change any of the infrastructure quayside. The autonomous vehicle which carries the energy storage module to and from the vessel may use the same ro-ro ramp as existing cargo, lorries or cars, so no modification of the existing quay is needed. The autonomous vehicle may be an articulated lorry and the energy storage module may be incorporated into a standard ISO container on a flatbed trailer, so that the lorry brings a new trailer and energy storage module to the quayside, collects the used energy storage module on its trailer from the vessel and brings that to the quayside, then takes the new one on board and leaves it there before hitching up to the container with the used energy storage module and driving it back to the charging station. In other cases, the trailer may be self-powered and able to drive itself on and off the vessel to the quayside, even if a lorry cab may be required to take it from the quayside to the charging station. The autonomous lorry cab or trailer may make use of technology from existing autonomous vehicles to provide the necessary capabilities in operation.

Charging a battery, flywheel, or other type of electrical energy storage unit, to a given capacity over a longer time requires less peak power handling capability of the electrical supply network. The local electrical power grid would be less likely to need an upgrade to cope with the electric vessels, because the system of the present invention avoids the need for fast charging. For batteries, allowing longer charging times may also be better for the battery in the long term and the longer charging time may allow the use of a less expensive battery, which does not have to be able to cope with fast charging. The battery is able to reach a higher state of charge than would be possible with a permanently installed onboard battery that is only charged during the short time that the vessel is in port. There is an environmental benefit for the harbour area generally, in that both the vessels visiting and the means by which the vessels recharge avoid generation of emissions in the harbour area when using electric systems.

The invention claimed is:

1. A method of providing energy storage units to an energy storage system on a vessel adapted to use stored energy, the method comprising:
   receiving notification at a charging station onshore, of a user energy storage requirement;
   dispatching an autonomous vehicle from the charging station with one or more replacement energy storage units for the energy storage system;
   removing one or more used energy storage units on the autonomous vehicle from an operational location of the energy storage system;
   inserting the replacement energy storage unit at the same operational location of the energy storage system; and
   returning the used energy storage unit to the charging station;
   wherein the method is performed at a port that comprises;

a quayside where the vessel is docked, and
the charging station that is positioned within the port and outside of the quayside such that the dispatching step comprises dispatching the autonomous vehicle from the charging station within the port and outside the quayside to the vessel at the quayside;
and wherein the port further comprises;
a ramp from the quayside to the vessel to enable passengers, vehicles and cargo to go on and off the vessel;
wherein the dispatching step further comprises dispatching the autonomous vehicle from the quayside over the ramp and onto the vessel to the operational location of the energy storage system on the vessel.

2. The method according to claim 1, further comprising:
connecting the used energy storage units to a charger in the charging station to recharge the used energy storage units.

3. The method according to claim 1, further comprising:
receiving an indication of a level of energy remaining in each energy storage unit in the energy storage system when the vessel is still under way; and
determining a time remaining until the vessel docks and dispatching the autonomous vehicle to meet the vessel when it docks.

4. The method according to claim 1,
wherein the charging station monitors type and number of stocked charged energy storage units onshore and provides an availability list to the vessel in response to the notification of the user energy storage requirement.

5. The method according to claim 1,
wherein the energy storage system requests a type and a number of energy storage units closest to its requirement.

6. An energy storage system adapted for carrying out the method of claim 1, comprising:
one or more energy storage units adapted for use on a vessel;
one or more of the energy storage units being stocked by a store associated with an onshore charging station;
a communications interface between the vessel and the charging station to enable notification of an energy storage requirement to be received from the vessel; and
an autonomous vehicle associated with the charging station to transport the one or more energy storage units between the charging station and the vessel;
wherein the autonomous vehicle comprises;
an autonomous lorry cab and trailer, wherein the energy storage units remain on the trailer when installed on the vessel and the lorry cab is detached from the trailer, or
a single autonomous self-driving transport unit, wherein the energy storage units remain on the autonomous self-driving transport unit when installed on the vessel.

7. The energy storage system according to claim 6, comprising:
a plurality of energy storage units containing energy storage devices, mounted within an ISO standard container or custom sized container.

8. The energy storage system according to claim 7,
wherein the energy storage unit connects to an electrical system of the vessel via connectors in a base of the container when installed.

9. The energy storage system according to claim 6,
wherein the energy storage unit connects to an electrical system of the vessel via connectors, rails or pantograph on the side of or at the top of the energy storage unit when placed on the vessel or at the charging station onshore.

10. The method according to claim 1, wherein the autonomous vehicle has its own motive power and is independent of any physical power infrastructure including cable connections or rails.

11. The energy storage system according to claim 6, wherein the autonomous vehicle has its own motive power and is independent of any physical power infrastructure including cable connections or rails.

12. The method according to claim 1, wherein the charging station is located at a fixed position within the port.

13. A method of providing energy storage units to an energy storage system on a vessel adapted to use stored energy, wherein the vessel is docked at a quayside of a port, the method comprising:
receiving notification at a charging station or a store of a user energy storage requirement, wherein the charging station or the store is located within the port and outside the quayside;
dispatching an autonomous vehicle from the charging station or the store with one or more replacement energy storage units for the energy storage system, comprising;
dispatching the autonomous vehicle from the charging station or the store within the port and outside the quayside to the quayside where the vessel is docked, and
dispatching the autonomous vehicle from the quayside over a ramp between the quayside and the vessel to an operational location of the energy storage system on the vessel,
removing one or more used energy storage units on the autonomous vehicle from the operational location of the energy storage system;
inserting the replacement energy storage unit at the same operational location of the energy storage system; and
returning the used energy storage unit to the charging station or the store with the autonomous vehicle including;
dispatching the autonomous vehicle from the operational location of the energy storage system on the vessel over the ramp to the quayside, and
dispatching the autonomous vehicle from the quayside to the charging station located within the port and outside the quayside.

14. The method according to claim 13, wherein the autonomous vehicle has its own motive power and is independent of any physical power infrastructure including cable connections or rails.

15. The method according to claim 13, wherein the charging location and the store are positioned at different locations within the port and outside the quayside.

16. The method according to claim 13, wherein the store is part of the charging location.

17. The method according to claim 13, wherein the method further comprises:
moving one or more charged energy storage units from the charging station to the store to free up connections at the charging station to charge additional energy storage units; and
wherein the dispatching step comprises dispatching the autonomous vehicle from the store with the one or more replacement energy storage units to the quayside and the vessel.

18. An energy storage system adapted for carrying out the method of claim 13, comprising:
- one or more energy storage units adapted for use on a vessel;
- one or more of the energy storage units being stocked by the store associated with the charging station;
- a communications interface between the vessel and the charging station or the store to enable notification of an energy storage requirement to be received from the vessel; and
- an autonomous vehicle associated with the charging station or the store to transport the one or more energy storage units between the charging station or the store and the vessel;
- wherein the autonomous vehicle comprises;
  - an autonomous lorry cab and trailer, wherein the energy storage units remain on the trailer when installed on the vessel and the lorry cab is detached from the trailer, or
  - a single autonomous self-driving transport unit, wherein the energy storage units remain on the autonomous self-driving transport unit when installed on the vessel; and
- wherein the autonomous vehicle has its own motive power and is independent of any physical power infrastructure including cable connections or rails.

\* \* \* \* \*